US011290010B2

(12) United States Patent
Namekawa et al.

(10) Patent No.: US 11,290,010 B2
(45) Date of Patent: Mar. 29, 2022

(54) SWITCHING POWER CIRCUIT

(71) Applicants: Kabushiki Kaisha Toshiba, Tokyo (JP); Toshiba Electronic Devices & Storage Corporation, Tokyo (JP)

(72) Inventors: Toshimasa Namekawa, Ota Tokyo (JP); Ryoma Matsuo, Kawasaki Kanagawa (JP); Katsumasa Tanaka, Nagareyama Chiba (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 99 days.

(21) Appl. No.: 16/800,168

(22) Filed: Feb. 25, 2020

(65) Prior Publication Data

US 2021/0083574 A1 Mar. 18, 2021

(30) Foreign Application Priority Data

Sep. 13, 2019 (JP) .............................. JP2019-167361

(51) Int. Cl.
*H02M 3/156* (2006.01)
*H02M 1/44* (2007.01)
*H02M 1/08* (2006.01)
*H02M 1/00* (2006.01)
*H02M 3/155* (2006.01)

(52) U.S. Cl.
CPC ......... *H02M 3/156* (2013.01); *H02M 1/0025* (2021.05); *H02M 1/08* (2013.01); *H02M 1/44* (2013.01); *H02M 1/0032* (2021.05); *H02M 3/155* (2013.01)

(58) Field of Classification Search
CPC .. H02M 1/0025; H02M 1/0032; H02M 3/156; H02M 1/0019
See application file for complete search history.

(56) References Cited

U.S. PATENT DOCUMENTS

| 7,009,367 | B1 * | 3/2006 | Sakurai | H02M 3/156 |
| | | | | 323/222 |
| 10,014,778 | B1 * | 7/2018 | Wei | H02M 3/155 |
| 2005/0189930 | A1 * | 9/2005 | Wu | G05F 1/575 |
| | | | | 323/280 |
| 2006/0113974 | A1 * | 6/2006 | Kan | H02M 3/156 |
| | | | | 323/282 |

(Continued)

FOREIGN PATENT DOCUMENTS

| JP | H05-304771 A | 11/1993 |
| JP | 2009-100552 A | 5/2009 |

(Continued)

*Primary Examiner* — Kyle J Moody
(74) *Attorney, Agent, or Firm* — Allen & Overy LLP

(57) ABSTRACT

According to one embodiment, a switching power circuit, includes: a switching transistor that is connected between an input terminal and a node; a driving circuit that supplies a PWM driving signal to the switching transistor; and a phase compensation circuit that supplies a feedback voltage to an error amplifier, in which the properties of the phase compensation circuit are switched in accordance with the voltage of the node immediately before the switching transistor is turned on.

24 Claims, 10 Drawing Sheets

(56) References Cited

U.S. PATENT DOCUMENTS

| | | | | |
|---|---|---|---|---|
| 2008/0252274 | A1* | 10/2008 | Schindler | H02M 3/1588 |
| | | | | 323/282 |
| 2009/0102444 | A1 | 4/2009 | Nonaka | |
| 2010/0244800 | A1* | 9/2010 | Nakamura | H02M 3/156 |
| | | | | 323/284 |
| 2014/0320104 | A1* | 10/2014 | Guo | H02M 3/158 |
| | | | | 323/290 |
| 2014/0361755 | A1* | 12/2014 | Tateishi | H02M 3/1588 |
| | | | | 323/271 |
| 2017/0077821 | A1 | 3/2017 | Namekawa | |
| 2019/0028027 | A1* | 1/2019 | Cho | H02M 1/143 |
| 2020/0304034 | A1 | 9/2020 | Namekawa | |
| 2021/0091656 | A1 | 3/2021 | Namekawa | |

FOREIGN PATENT DOCUMENTS

| | | |
|---|---|---|
| JP | 5187753 B2 | 4/2013 |
| JP | 2017-55627 A | 3/2017 |
| JP | 2020-156215 A | 9/2020 |
| JP | 2021-48727 A | 3/2021 |

\* cited by examiner

SWITCHING POWER CIRCUIT

CROSS-REFERENCE TO RELATED APPLICATIONS

This application is based upon and claims the benefit of priority from Japanese Patent Application No. 2019-167361, filed on Sep. 13, 2019; the entire contents of which are incorporated herein by reference.

FIELD

Embodiments described herein relate generally to a switching power circuit.

BACKGROUND

In the related art, a technology of a switching power circuit is disclosed in which the properties of a phase compensation circuit that supplies a feedback voltage of an output voltage to an error amplifier are switched in accordance with a load state, and thus, load response properties are improved. In order to switch the properties of the phase compensation circuit, in accordance with whether the load is a heavy load or a light load, a configuration is desirable in which it is possible to accurately determine the load state. In addition, a switching power circuit is desirable in which an input variation with respect to the error amplifier at the time of switching the properties of the phase compensation circuit is suppressed, and property switching of the phase compensation circuit, based on a determination result of the load state, can be smoothly performed.

DETAILED DESCRIPTION

According to one embodiment, a switching power circuit, includes: a switching transistor in which a main current path is connected between an input terminal to which an input voltage is applied and a node; an inductor that is connected between an output terminal outputting an output voltage and the node; an error amplifier that compares a feedback voltage of the output voltage with a predetermined reference voltage, and outputs an instruction signal according to a difference between the feedback voltage and the predetermined reference voltage; a driving circuit that generates a driving signal of which a duty ratio is controlled in accordance with the instruction signal of the error amplifier, and supplies the driving signal to the switching transistor; a phase compensation circuit that supplies the feedback voltage to the error amplifier; and a sensing circuit that senses a voltage of the node, in which properties of the phase compensation circuit are switched in accordance with the voltage of the node immediately before the switching transistor is turned on, the voltage being sensed by the sensing circuit.

Exemplary embodiments of a switching power circuit will be explained below in detail with reference to the accompanying drawings. Note that, the present invention is not limited to the following embodiments.

First Embodiment

Figure 1:
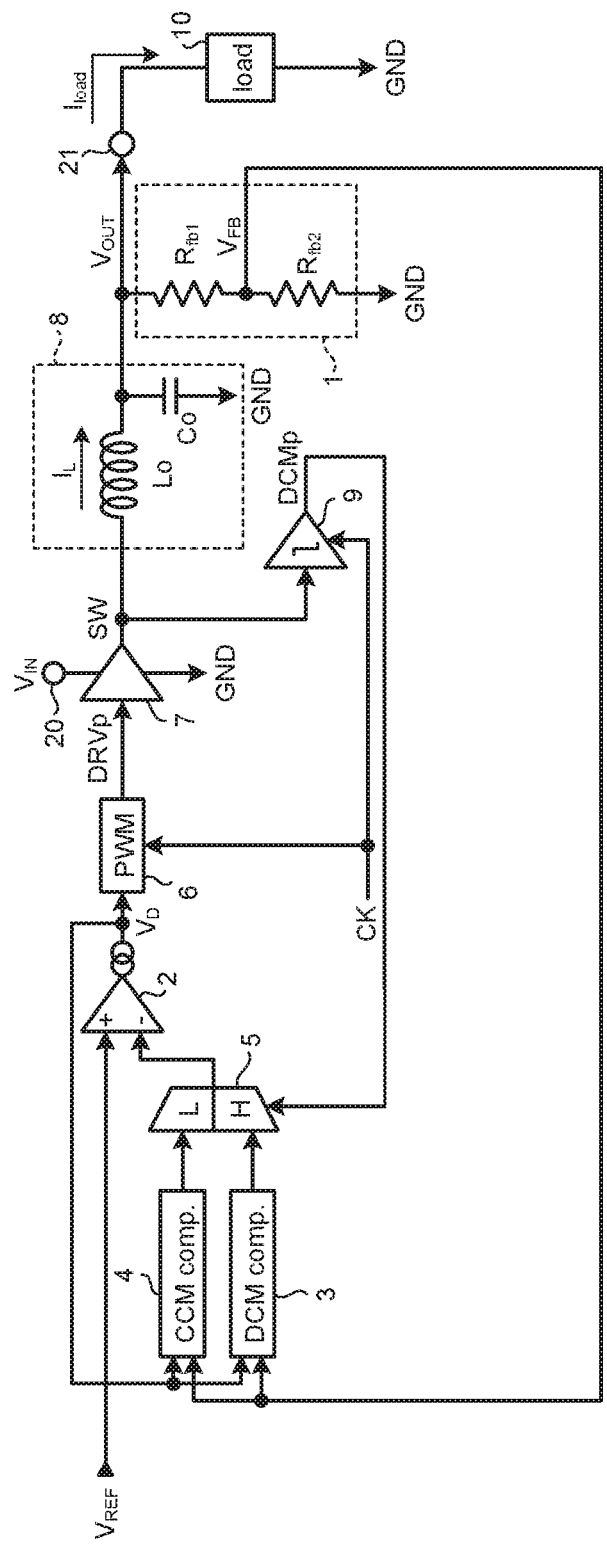
FIG. 1 is a configuration diagram of a switching power circuit of a first embodiment.

FIG. 1 is a configuration diagram of a switching power circuit of a first embodiment. The switching power circuit of this embodiment performs voltage feedback control by switching a phase compensation circuit to which a feedback voltage is supplied, in accordance with an output voltage. The switching power circuit includes an input terminal 20 to which a direct-current input voltage $V_{IN}$ is applied, and an output terminal 21 outputting a load current $I_{load}$, and supplies the load current $I_{load}$ to a load 10. A driver circuit 7 is connected between the input terminal 20 and a ground GND. The driver circuit 7 responds to a driving signal DRVp. An output terminal of the driver circuit 7 is connected to a node SW.

A low-pass filter 8 including an inductor Lo and a capacitor Co is connected between the node SW and the output terminal 21. The node SW is connected to one end of the inductor Lo, and the output terminal 21 is connected to the other end. The output terminal 21 is connected to one end of the capacitor Co, and the ground GND is connected to the other end. The output terminal 21 is connected to one end of the load 10. The other end of the load 10 is the ground GND.

A resistance voltage divider 1 is connected between the output terminal 21 and the ground GND. The resistance voltage divider 1 is a series circuit of a resistance $R_{fb1}$ and a resistance $R_{fb2}$. The resistance voltage divider 1 outputs a feedback voltage $V_{FB}$ from a connection point between the resistance $R_{fb1}$ and the resistance $R_{fb2}$. The feedback voltage $V_{FB}$ is an output voltage Vout that is divided by a ratio of the resistance $R_{fb1}$ and the resistance $R_{fb2}$.

The feedback voltage $V_{FB}$ is supplied to a switching device 5 through a phase compensation circuit 3 for a light load and a phase compensation circuit 4 for a heavy load, in order to ensure a phase margin. The switching device 5 selects output of one of the phase compensation circuit 3 for a light load and the phase compensation circuit 4 for a heavy load, in response to a mode sensing signal DCMp, and supplies the output to an inversion input end (−) of the error amplifier 2. The error amplifier 2 compares the feedback voltage $V_{FB}$ with a reference voltage $V_{REF}$, generates an instruction signal $V_D$ according to a voltage difference between the feedback voltage $V_{FB}$ and the reference voltage $V_{REF}$, and outputs the instruction signal $V_D$ to a pulse width modulator 6.

The pulse width modulator 6 outputs the driving signal DRVp of pulse width modulation (PWM) of which the duty is changed in accordance with a sawtooth wave (not illustrated) that is generated in response to a clock signal CK, and the instruction signal $V_D$.

A load amount determination device 9 determines whether or not the load 10 is a light load or a heavy load, in response to the clock signal CK. The load amount determination device 9 outputs the mode sensing signal DCMp for controlling the switching device 5, in accordance with a determination result. In a case where it is determined that the load is the light load, the phase compensation circuit 3 for a light load is selected, and in a case where it is determined that the load is the heavy load, the phase compensation circuit 4 for a heavy load is selected. That is, a path for supplying the feedback voltage $V_{FB}$ to the error amplifier 2 is switched by the mode sensing signal DCMp. The properties of the phase compensation circuit that is connected to the error amplifier 2 are switched in accordance with a load state, and thus, it is possible to improve load response properties.

Figure 2:
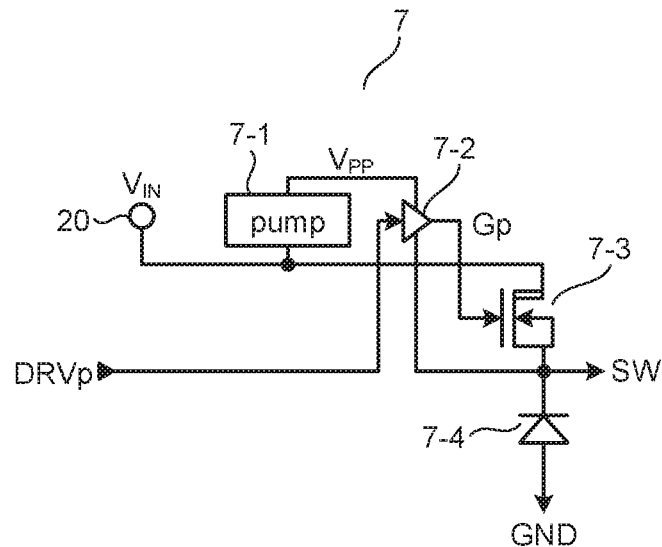
FIG. 2 is a diagram illustrating one example of a driver circuit.

FIG. 2 is a diagram illustrating a configuration example of the driver circuit 7. This configuration is an example of an asynchronous rectification switching driver circuit. The driver circuit 7 includes a voltage boosting charge pump 7-1 generating a voltage $V_{PP}$ that is a high voltage from the input voltage $V_{IN}$, a pre-driver 7-2, a switching transistor 7-3, and a diode 7-4.

The pre-driver 7-2 is biased by the voltage $V_{PP}$ and the voltage of the node SW. The pre-driver 7-2 generates a driving signal Gp in which the voltage of the driving signal DRVp is shifted, and supplies the driving signal Gp to a gate of the switching transistor 7-3. The switching transistor 7-3 is an NMOS type switching transistor, in which the input terminal 20 is connected to a drain, and the node SW is connected to a source. That is, a source and drain path that is a main current path of the switching transistor 7-3 is connected in series between the input terminal 20 and the node SW. The load amount determination device 9 determines the state of the load 10 by comparing the voltage of the node SW immediately before the switching transistor 7-3 is turned on with a predetermined threshold value. In the diode 7-4, the node SW is connected to a cathode, and the ground GND is connected to an anode. When the switching transistor 7-3 is turned on in response to the driving signal Gp, the input voltage $V_{IN}$ is supplied to the node SW.

Figure 3:
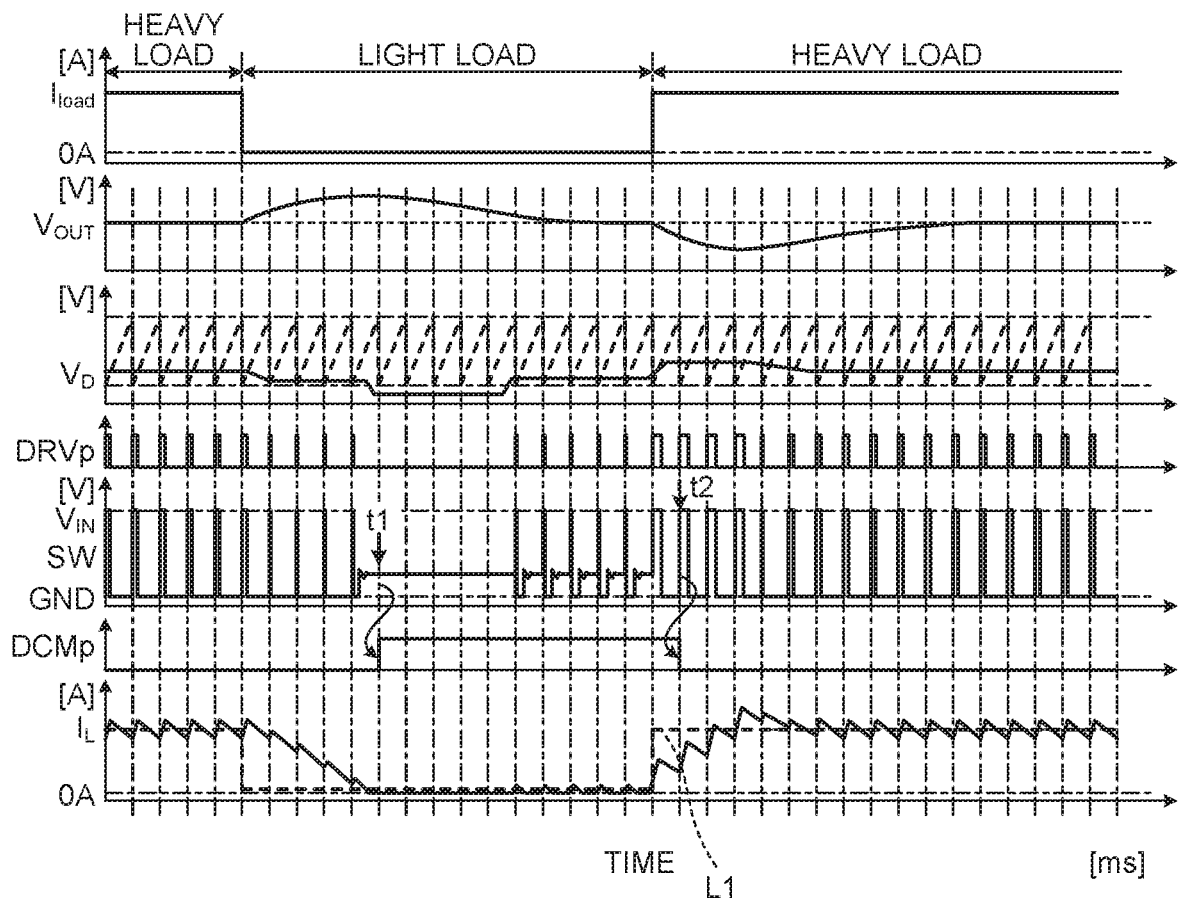
FIG. 3 is a diagram schematically illustrating an operation waveform of the switching power circuit of the first embodiment.

FIG. 3 is a diagram schematically illustrating an operation waveform of this example. The operation of the switching power circuit of this example will be described by using FIG. 3. The load current $I_{load}$ is illustrated on the first line. A case is schematically illustrated in which the load 10 is changed to the light load from the heavy load, and is returned again to the heavy load.

The output voltage $V_{OUT}$ is illustrated on the next line. The output voltage $V_{OUT}$ increases at a time point when the load precipitously decreases. After that, the output voltage $V_{OUT}$ gradually decreases, and returns to a set voltage illustrated by a broken line, by the voltage feedback control. Next, the output voltage $V_{OUT}$ decreases at a time point when the load precipitously increases. After that, the output voltage $V_{OUT}$ gradually increases, and returns to the set voltage, by the voltage feedback control.

The instruction signal $V_D$ is illustrated on the next line by a solid line, and the sawtooth wave is illustrated by a broken line. The sawtooth wave is generated by a sawtooth wave generation circuit (not illustrated) provided in the pulse width modulator 6, in response to the clock signal CK. In a case where the output voltage $V_{OUT}$ is higher than the set voltage, the error amplifier 2 decreases the voltage of the instruction signal $V_D$. In contrast, in a case where the output voltage $V_{OUT}$ is lower than the set voltage, the error amplifier increases the voltage of the instruction signal $V_D$. The driving signal DRVp is illustrated on the next line. The pulse width modulator 6 compares a voltage relationship between the instruction signal $V_D$ and the sawtooth wave. The error amplifier 2 sets the driving signal DRVp to be at an H level when the sawtooth wave has a voltage lower than that of the instruction signal $V_D$, and sets the driving signal DRVp to be at an L level when the sawtooth wave has a voltage higher than that of the instruction signal $V_D$. A duty ratio of the driving signal DRVp is changed in accordance with the instruction signal $V_D$.

Further, a voltage waveform of the node SW is illustrated on the next line. The driver circuit 7 connects the node SW to the input terminal 20 when the driving signal DRVp is at the H level. At this time, the voltage of the node SW is approximately identical to the voltage of the input voltage $V_{IN}$. On the other hand, when the driving signal DRVp is at the L level, the driver circuit 7 releases the connection between the node SW and the input terminal 20. Then, the node SW is discharged by the inductor current $I_L$ flowing through the inductor Lo, and the voltage thereof decreases. In a case where the voltage of the node SW is lower than the voltage of the ground GND, the diode 7-4 is in a conductive state. Accordingly, the node SW is grounded, and a current is supplied towards the node SW from the ground GND side.

The mode sensing signal DCMp is illustrated on the next line. The load amount determination device 9, for example, determines the load state by sensing the voltage of the node SW immediately before the switching transistor 7-3 is turned on in response to the clock signal CK. For example, as illustrated by a timing t1, in a case where an increase in the voltage of the node SW is sensed, it is determined that the inductor current $I_L$ is dis-continuous, and the mode sensing signal DCMp is set at the H level. In contrast, when the load current $I_{load}$ is large, the inductor current $I_L$ continuously flows, and thus, the voltage of the node SW does not increase. For example, as illustrated by a timing t2, in a case where an increase in the voltage of the node SW is not sensed, the load amount determination device 9 sets the mode sensing signal DCMp to be at the L level.

The inductor current $I_L$ is illustrated on the next line by a solid line. In a case where the node SW and the input terminal 20 are connected to each other, a voltage difference $V_{OUT}$-$V_{IN}$ occurs on both ends of the inductor Lo, and the inductor current $I_L$ is charged and increased. After that, in a case where the connection between the node SW and the input terminal 20 is released, the voltage of the node SW is grounded to be 0 V, and thus, a voltage difference $-V_{IN}$ occurs on the both ends of the inductor Lo, and the inductor current $I_L$ is discharged and decreased.

When the load current $I_{load}$ illustrated by a broken line L1 is constant, an average value $|I_L|$ of the inductor current $I_L$ is coincident with a current amount. In a case where the load current $I_{load}$ decreases, a time for connecting the node SW and the input terminal 20 shortens, and the inductor current $I_L$ decreases. In contrast, in a case where the load current $I_{load}$ increases, the time for connecting the node SW and the input terminal 20 lengthens, and the inductor current $I_L$ increases.

However, in a case where the load current $I_{load}$ precipitously decreases, a decrease rate of the inductor current $I_L$ does not catch up a decrease rate of the load current. For this reason, the current is in a state of being excessively supplied, and the output voltage $V_{OUT}$ increases with respect to a set value. In a case where an increase amount is large, the instruction signal $V_D$ extremely decreases, and a period continues in which the node SW and the input terminal 20 are not connected to each other.

Consequently, the inductor current $I_L$ is completely discharged, a current flows back to the node SW from the output terminal 21, and the voltage of the node SW increases to the output voltage $V_{OUT}$. Even after the average value $|I_L|$ of the inductor current $I_L$ is identical to the load current $I_{load}$, an increase in the voltage of the output node SW occurs after switching transistor is turned off, in each switching operation. Accordingly, an increase of the voltage of the node SW immediately before the switching transistor 7-3 is turned on is sensed by the load amount determination device 9, and thus, it is possible to determine that the load is the light load.

As described above, the voltage of the node SW immediately before the switching transistor 7-3 is turned on is sensed, and thus, it is possible to accurately determine whether the load is the heavy load or the light load. The switching device 5 switches the phase compensation circuit that supplies the feedback voltage $V_{FB}$ to the error amplifier 2, in accordance with a determination result, that is, performs switching control by the mode sensing signal DCMp such that the phase compensation circuit 3 for a light load is selected at the time of the light load, and the phase compensation circuit 4 for a heavy load is selected at the time of the heavy load. The properties of the phase compensation circuit that is connected to the error amplifier 2 are switched in accordance with the load state, and thus, it is possible to improve the load response properties.

Figure 4:
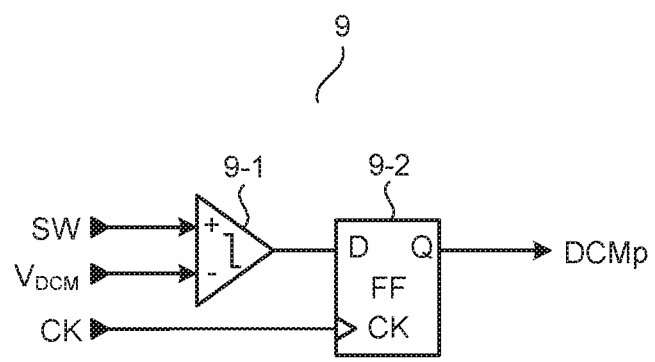
FIG. 4 is a diagram illustrating one example of a load amount determination circuit.

FIG. 4 is a diagram illustrating one configuration example of the load amount determination device 9. The load amount determination device 9 includes a comparator 9-1 and a D type flip-flop 9-2 that are asynchronously operated. In the comparator 9-1, the node SW is connected to a non-inversion input end (+), and a load determination reference voltage $V_{DCM}$ is supplied to an inversion input end (−). The load determination reference voltage $V_{DCM}$, for example, is supplied from the outside, as a set voltage. The comparator 9-1 outputs the H level when the voltage of the node SW is higher than the load determination reference voltage $V_{DCM}$, and outputs the L level when the voltage of the node is lower than the load determination reference voltage $V_{DCM}$. The D type flip-flop 9-2 incorporates the output of the comparator 9-1 at a point when the clock signal CK is transitioned to the H level, and retains such a state. In addition, the D type flip-flop 9-2 retains a determination result according to the voltage of the node SW immediately before the switching transistor 7-3 is turned in response to the driving signal DRVp, and outputs the determination result as the mode sensing signal DCMp.

Note that, the voltage of the node SW at the time of a continuous inductor current mode (hereinafter, referred to as a continuous conduction mode (CCM)) in which the inductor current $I_L$ continuously flows is a negative voltage that is identical to a threshold voltage of the diode 7-4. The voltage of the node SW at the time of a non-continuous inductor current mode (hereinafter, referred to as a discontinuous conduction mode (DCM)) in which the inductor current $I_L$ is not continuous is a positive voltage that is approximately identical to the output voltage $V_{OUT}$. Therefore, it is preferable that the load determination reference voltage $V_{DCM}$ is set to a comparatively low voltage of approximately 0 V to 1 V.

A maximum peak current $I_{LpkDCMmax}$ in which the inductor current $I_L$ is dis-continuous, as represented in Expression (1), is set by the input voltage $V_{IN}$, the output voltage $V_{OUT}$, a switching frequency $f_{SW}$, a capacitance value of the capacitor Co, and an inductance value of the inductor Lo. Note that, the switching frequency $f_{SW}$ is a frequency for turning on and off the switching transistor 7-3.

[Expression 1]

$$I_{LpkDCMmax} = \frac{1}{fsw} \cdot \frac{V_{IN} - V_{OUT}}{Lo} \cdot \frac{V_{OUT}}{V_{IN}} \quad (1)$$

An average load current $|I_{load}|$ is half of the peak current $I_{LpkDCMmax}$ at boundary between the CCM and the DCM. That is, when the average load current $|I_{load}|$ is lower than half of the peak current $I_{LpkDCMmax}$, the switching power circuit is operated in the DCM. A critical load resistance $R_{loadCrit}$ in which the inductor current $I_L$ is a boundary between the CCM and the DCM can be represented as Expression (2).

[Expression 2]

$$R_{loadCrit} = \frac{2 \cdot V_{OUT}}{I_{LpkDCMmax}} = \frac{2 \cdot fsw \cdot Lo \cdot V_{IN}}{V_{IN} - V_{OUT}} \quad (2)$$

When the load resistance $R_{load}$ is less than the critical load resistance $R_{loadCrit}$, the inductor current $I_L$ is in the CCM, and thus, such a state is determined as the heavy load. In contrast, when the load resistance $R_{load}$ is greater than the critical load resistance $R_{loadCrit}$, the inductor current $I_L$ is in the DCM, and thus, such a state is determined as the light load.

For example, when the switching frequency $f_{SW}$ is operated at 500 kHZ, the inductance of the inductor Lo is 33 μH, and the output voltage $V_{OUT}$ of 15 V obtained from the input voltage $V_{IN}$ of 30 V, the critical load resistance $R_{loadCrit}$ is 66Ω. In this case, when the load resistance $R_{load}$ is less than 66Ω, the load is the heavy load, and when the load resistance is greater than 66Ω, the load is the light load.

In the voltage feedback control, it is necessary to compensate a phase rotation of 180° that occurs in the vicinity of a cutoff frequency of the low-pass filter 8. In the voltage feedback control, open-loop transfer properties are completely different between the CCM and the DCM, and thus, it is possible to improve the load response properties of the switching power circuit by switching the properties of the phase compensation circuit, in accordance with the load state.

Second Embodiment

Figure 5:
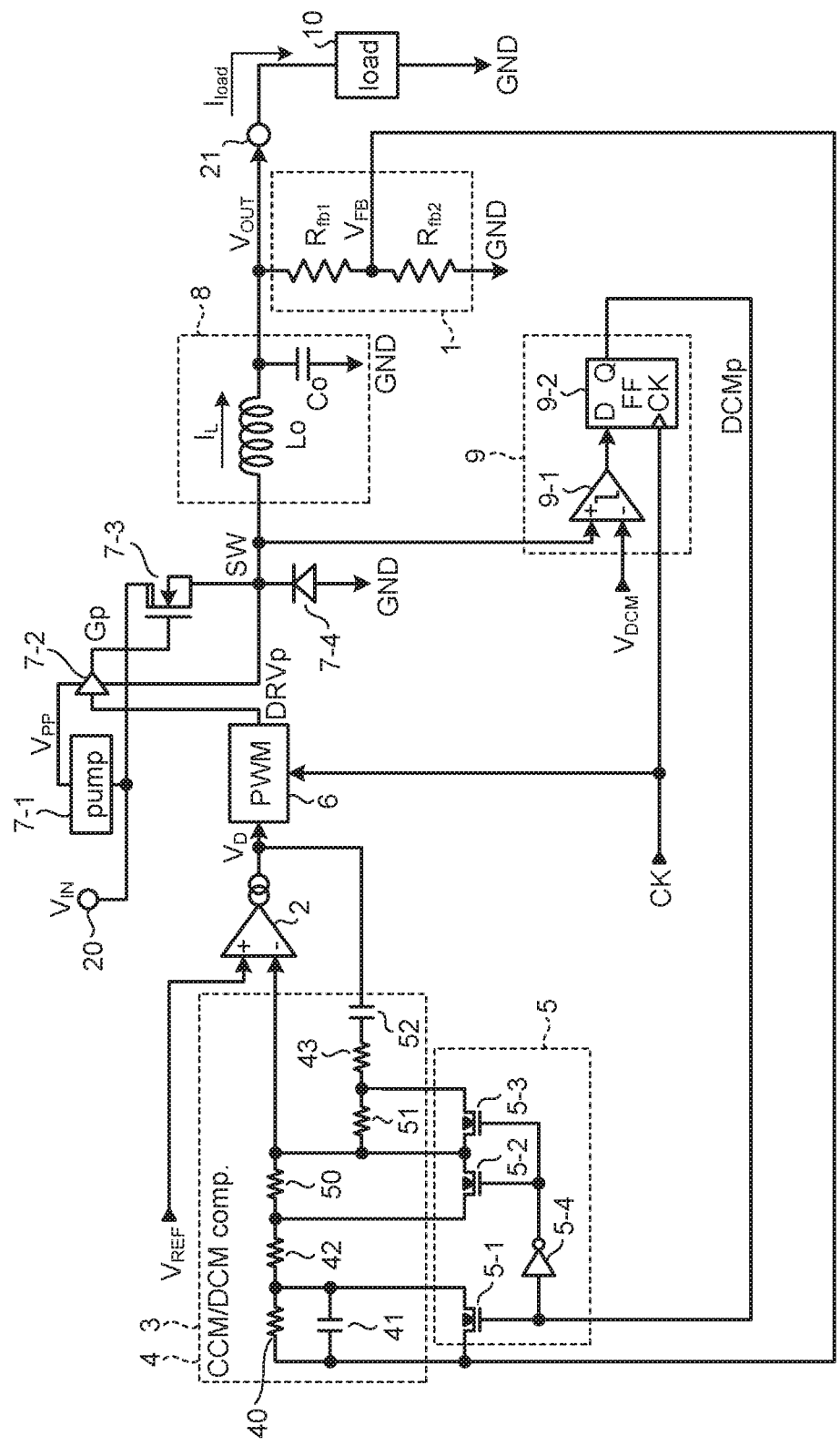
FIG. 5 is a configuration diagram of a switching power circuit of a second embodiment.

FIG. 5 is a configuration diagram of a switching power circuit of a second embodiment. The same reference numerals will be applied to configurations corresponding to the embodiment described above, and the repeated description will be made when absolutely necessary. The same applies to the followings.

The switching power circuit of this embodiment shares a part of an element configuring the phase compensation circuit 3 for a light load and the phase compensation circuit 4 for a heavy load. The switching device 5 includes NMOS transistors 5-1 to 5-3 that connect or cut off the element configuring the phase compensation circuit 3 for a light load and the phase compensation circuit 4 for a heavy load, in response to the mode sensing signal DCMp, and an inverter 5-4.

The phase compensation circuit 3 for a light load of this embodiment includes four resistances 42, 43, 50, and 51, and a capacitance 52. For example, a gain $G_z$ at a zero frequency can be obtained by $R_{d1}/R_{d2}$, and a zero frequency fz can be obtained by $1/(2\pi \cdot R_{d1} \cdot C_{d1})$, which are important parameters of the phase compensation circuit 3 for a light load. Here, $R_{d1}$ is the total value of the resistance 51 and the resistance 43, the resistance $R_{d2}$ is the total value of the resistance 42 and the resistance 50, and $C_{d1}$ is a capacitance value of the capacitance 52. The resistance value and the capacitance value are set in accordance with desired transfer properties at the light load.

The phase compensation circuit 4 for a heavy load includes three resistances 40, 42, and 43 and two capacitances 41 and 52. For example, a gain $G_{z1}$ at a first zero frequency can be obtained by $R_{c3}/R_{c1}$, a first zero frequency $f_{z1}$ can be obtained by $1/(2\pi \cdot R_{c1}/C_{c1})$, a second zero frequency $f_{z2}$ can be obtained by $1/(2\pi \cdot R_{c2} \cdot C_{c2})$, and a ratio of $f_{p2}/f_{z2}$ of the second pole frequency to the second zero frequency can be obtained by $(R_{c3}+R_{c2})/R_{c3}$, which are important parameters of the phase compensation circuit 4 for a heavy load. Here, $R_{c1}$ is a resistance value of the resistance 43, $R_{c2}$ is a resistance value of the resistance 40, $R_{c3}$ is a resistance value of the resistance 42, $C_{c1}$ is the capacitance value ($=C_{d1}$) of the capacitance 52 that is shared by the phase compensation circuit 3 for a light load, and $C_{c2}$ is a capacitance value of the capacitance 41. The resistance value and the capacitance value are set in accordance with desired transfer properties at the heavy load.

The resistances 42 and 43, and the capacitance 52 are shared in the phase compensation circuit 3 for a light load and the phase compensation circuit 4 for a heavy load. On/Off of the transistors 5-1 to 5-3 is controlled by the mode sensing signal DCMp, and thus, a connection relationship between each of the resistances and each of the capacitances is switched, and therefore, it is possible to configure the phase compensation circuit 3 for a light load and the phase compensation circuit 4 for a heavy load. It is possible to share a part of the element configuring the phase compensation circuit, and thus, it is possible to suppress the cost by reducing the number of elements.

Third Embodiment

Figure 6:
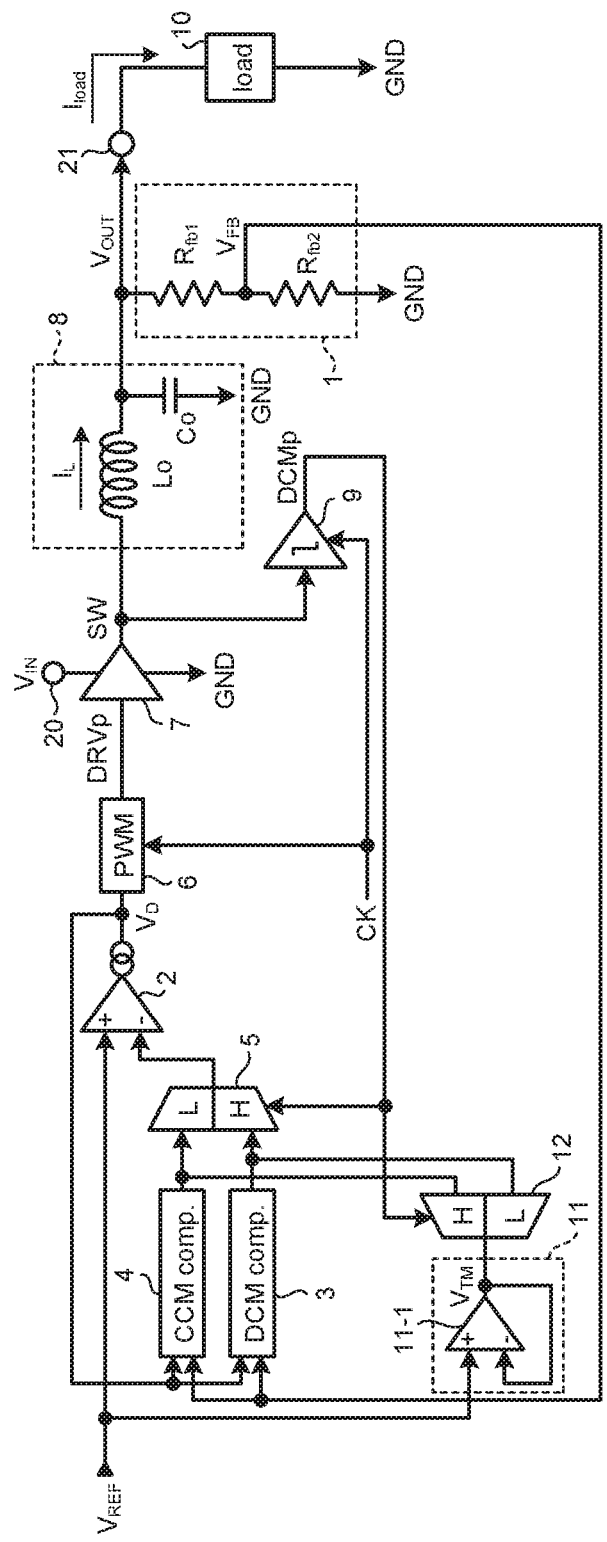
FIG. 6 is a configuration diagram of a switching power circuit of a third embodiment.

FIG. 6 is a configuration diagram of a switching power circuit of a third embodiment. The switching power circuit of this embodiment includes a voltage follower circuit 11 and a termination switching device 12. The voltage follower circuit 11 includes an operational amplifier 11-1 in which the reference voltage $V_{REF}$ is supplied to a non-inversion input end (+), and the output thereof is supplies to an inversion input end (−).

The voltage follower circuit 11 generates a termination voltage $V_{TM}$ that is approximately identical to the reference voltage $V_{REF}$. The termination switching device 12 selects the phase compensation circuit 4 for a heavy load when the mode sensing signal DCMp is at the H level, selects the phase compensation circuit 3 for a light load when the mode sensing signal DCMp is at the L level, and is connected to the voltage follower circuit 11.

The switching device 5 selects the phase compensation circuit 3 for a light load when the mode sensing signal DCMp is at the H level, and selects the phase compensation circuit 4 for a heavy load when the mode sensing signal DCMp is at the L level. That is, the termination switching device 12 connects the phase compensation circuit that is not selected by the switching device 5 to the voltage follower circuit 11, and retains the output thereof at the termination voltage $V_{TM}$.

When the phase compensation circuit 3 for a light load or the phase compensation circuit 4 for a heavy load is selected by the switching device 5, and is in a state of being used, the termination voltage $V_{TM}$ is supplied to an inversion input end (−) of the error amplifier 2, and thus, it is possible to prevent the voltage that is supplied to the inversion input end (−) of the error amplifier 2 at the time of switching the phase compensation circuit from being incontinuous. Accordingly, a variation in the output voltage $V_{OUT}$ due to the switching of the phase compensation circuit is suppressed, and thus, it is possible to smoothly perform the switching.

Fourth Embodiment

Figure 7:
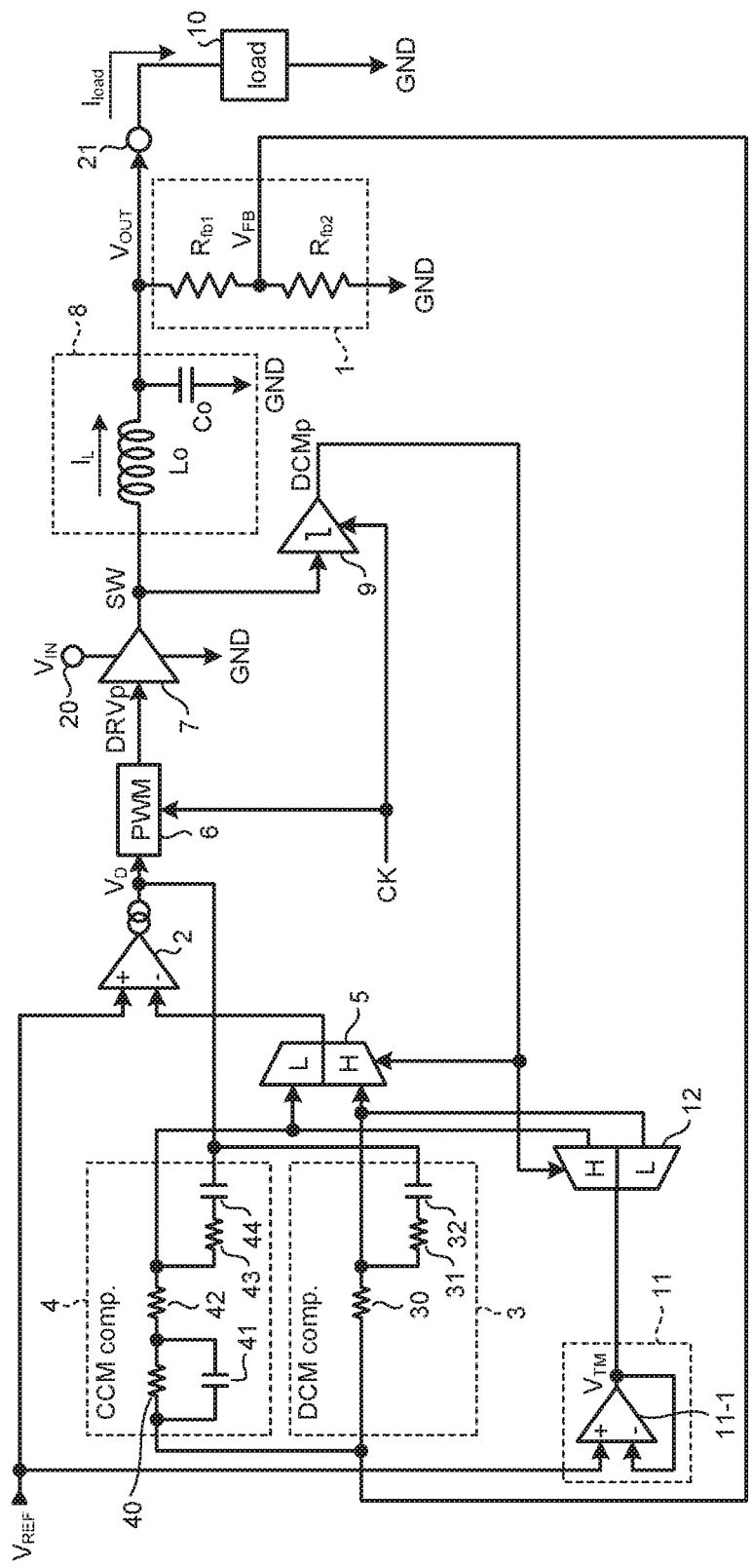
FIG. 7 is a diagram illustrating a configuration of a switching power circuit of a fourth embodiment.

FIG. 7 is a configuration diagram of a switching power circuit of a fourth embodiment. The phase compensation circuit 3 for a light load of this embodiment includes two resistances 30 and 31 and a capacitance 32. The phase compensation circuit 4 for a heavy load includes three resistances 40, 42, and 43 and two capacitances 41 and 44.

The operation of the switching device 5 and the termination switching device 12 is identical to that of the third embodiment. The capacitance 32 or the capacitance 44 is connected to the voltage follower circuit 11, in accordance with the switching of the termination switching device 12, and the termination voltage $V_{TM}$ is supplied. That is, a voltage on one end of the capacitance 32 or 44 is maintained to the termination voltage $V_{TM}$ by switching the termination switching device 12. Note that, it is preferable that a driving force of the voltage follower circuit 11 is suppressed to be low such that the instruction signal $V_D$ of the error amplifier 2 is not affected by the driving force.

The switching device 5 selects any one of phase compensation circuit 3 for a light load and the phase compensation circuit 4 for a heavy load, in accordance with the mode sensing signal DCMp, to be connected to the inversion input end (−) of the error amplifier 2. Here, in a case where the mode sensing signal DCMp is changed, the phase compensation circuit to be connected to the inversion input end (−) of the error amplifier 2 is instantaneously switched. At this time, a voltage on one end of the capacitance 32 or 44 configuring the phase compensation circuit that has not been selected is maintained to the termination voltage $V_{TM}$. For this reason, a voltage to be supplied to the inversion input end (−) of the error amplifier 2 is prevented from being incontinuous, by a switch operation.

As described above, according to the switching power circuit of this embodiment, when selection switching is performed by the switching device 5 between the phase compensation circuit 3 for a light load and the phase compensation circuit 4 for a heavy load, a voltage on one end side of the capacitance 32 or the capacitance 44 to which the termination voltage $V_T$ that is identical to the reference voltage $V_{REF}$ is applied, in a state of not being selected, is supplied to the inversion input end (−) of the error amplifier 2. For this reason, the voltage to be supplied to the inversion input end (−) of the error amplifier 2 is prevented from being incontinuous and a variation in the voltage is suppressed, by switching the phase compensation circuit, and thus, it is possible to supply a stable output voltage $V_{OUT}$ to the load 10.

Fifth Embodiment

Figure 8:
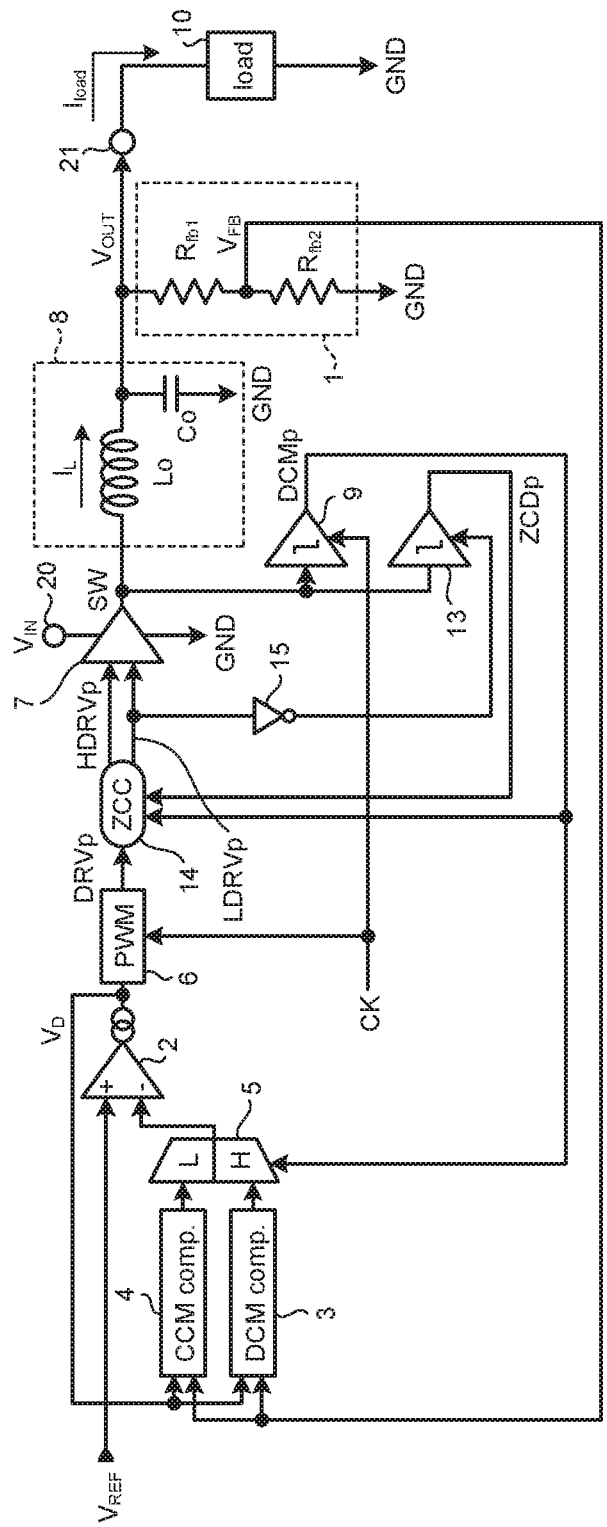
FIG. 8 is a diagram illustrating a configuration of a switching power circuit of a fifth embodiment.

FIG. 8 is a configuration diagram of a switching power circuit of a fifth embodiment. In the switching power circuit of this embodiment, the driver circuit 7 includes an NMOS switching transistor (not illustrated) on a highside and a lowside, respectively. Note that, here, the highside indicates the input terminal 20 side with respect to the node SW, and the lowside indicates the ground GND side with respect to the node SW. On/Off of each of the switching transistors is controlled by a driving signal HDRVp and a driving signal LDRVp.

The load amount determination device 9 that senses the load state by sensing the voltage of the node SW is provided. The clock signal CK is supplied to the load amount determination device 9, as a trigger signal. The load amount determination device 9 senses the voltage of the node SW immediately before the NMOS switching transistor on the highside is turned on, generates the mode sensing signal DCMp, in accordance with a sensing result, and outputs the mode sensing signal.

When the voltage of the node SW immediately before the switching transistor on the highside is turned on is higher than a predetermined voltage, the load amount determination device 9 outputs the mode sensing signal DCMp at the H level indicating the light load. The switching device 5 selects the phase compensation circuit 3 for a light load to be connected to the inversion input end (−) of the error amplifier 2.

The switching power circuit of this embodiment includes a zero cross sensing device 13 and a dead time control device 14. The zero cross sensing device 13 senses that the inductor current $I_L$ flows back, generates a zero cross sensing signal ZCDp, and outputs the zero cross sensing signal ZCDp. The dead time control device 14 receives the zero cross sensing signal ZCDp, and regulates a time when both of the switching transistors on the highside and the lowside are turned off (a dead time).

The fifth embodiment is a synchronous rectification switching power circuit provided with a synchronous rectification driver circuit 7 including the switching transistor on the lowside. An on resistance of the switching transistor is extremely small, and thus, when the switching transistor on the lowside is turned on, a voltage difference between the node SW and the ground GND hardly occurs. Therefore, the synchronous rectification switching power circuit has an advantage that in an efficiency at the time of the heavy load, a power conversion efficiency is excellent compared to an asynchronous rectification switching power circuit.

In the synchronous rectification switching power circuit, a period in which the switching transistors on the highside and the lowside simultaneously blocked, that is, the inductor current $I_L$ is prevented from flowing back, by providing the dead time. For this reason, a short period of margin is provided at a transition timing of the driving signal HDRVp and the driving signal LDRVp. The switching transistors on the highside and the lowside are prevented from being simultaneously turned on, and a through current is prevented, by providing the period in which both of the driving signal HDRVp and the driving signal LDRVp are at the L level (the dead time).

In a switching operation at the time of the heavy load in the synchronous rectification switching power circuit, the voltage of the node SW is lower than 0 V at a timing immediately after the switching transistor on the lowside is turned off, and increases in a case where the switching transistor on the highside is turned on. On the other hand, in a switching operation at the time of the light load, the voltage of the node SW starts to increase when the switching transistor on the lowside is turned off, before the switching transistor on the highside is turned on. This is a phenomenon that occurs due to the inductor current $I_L$. The voltage of the node SW immediately after the driving signal LDRVp is at the L level and the switching transistor on the lowside is turned off is sensed, and thus, it is possible to accurately determine whether the inductor current $I_L$ flows in a forward direction or flows in a reverse direction.

Figure 9:
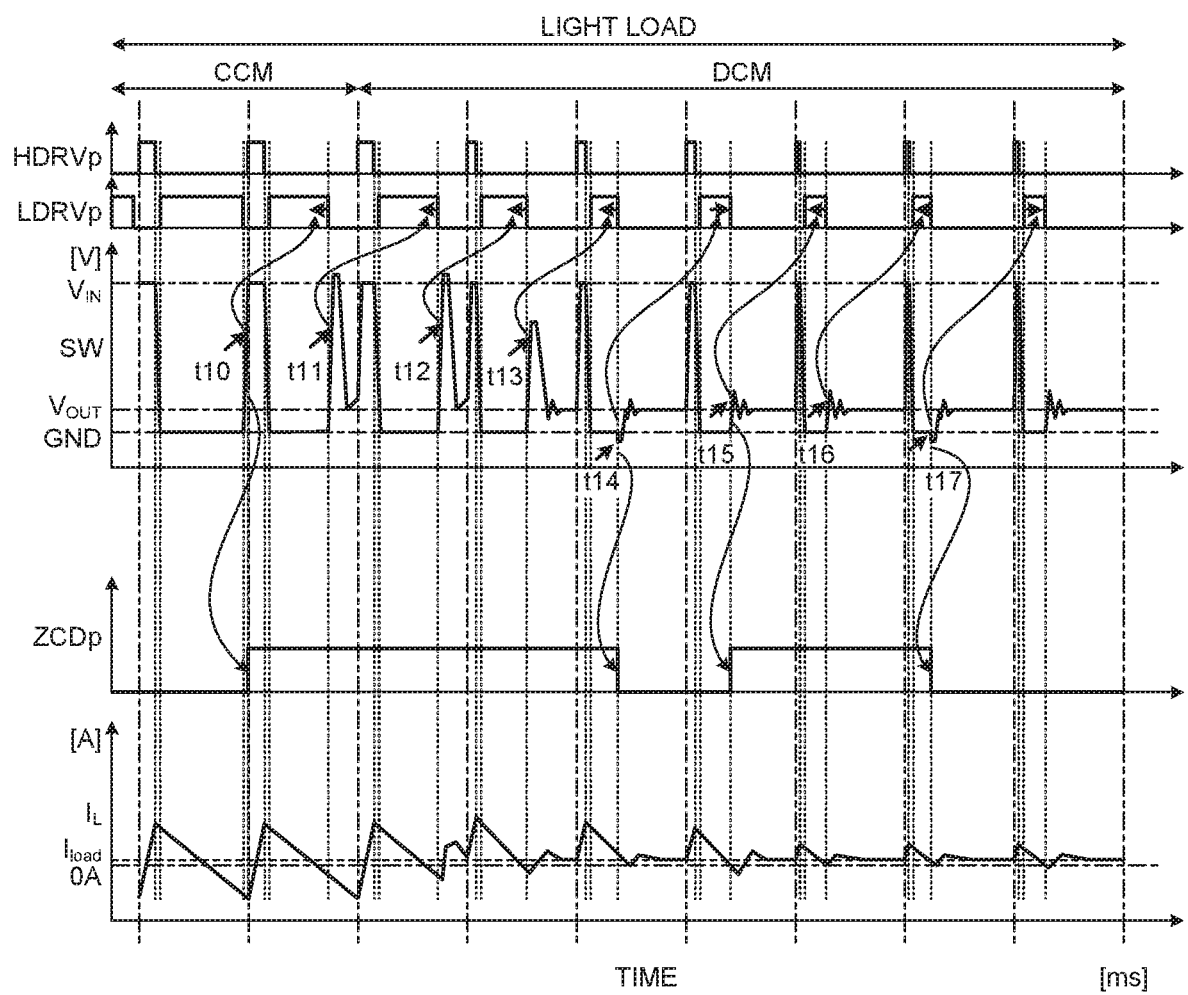
FIG. 9 is a diagram schematically illustrating an operation waveform of the fifth embodiment.

FIG. 9 is a diagram schematically illustrating an operation waveform of the switching power circuit of the fifth embodiment. Voltage waveforms of the driving signals HDRVp and LDRVp at the time of the light load are illustrated on the first line. The voltage waveform of the node SW is illustrated on the next line, and the waveform of the inductor current $I_L$ is illustrated on the last line.

A flow back prevention operation of the inductor current $I_L$ in this embodiment will be described. In two times of switching operations illustrated in the range of the CCM on a left side of FIG. 9, a time when both of the driving signals HDRVp and LDRVp are at the L level is a short time, and thus, in the latter half of the switching operation, the CCM is set in which the inductor current $I_L$ flows back, and the inductor current $I_L$ continuously flows.

In this embodiment, the voltage of the node SW immediately after the driving signal LDRVp is transitioned to the L level at timings t10 to t17 is sensed by the zero cross sensing device 13. In a case where the voltage of the node SW at the point is positive, it is determined that the inductor current $I_L$ is negative, and the zero cross sensing signal ZCDp is at the H level. In contrast, in a case where the voltage of the node SW is negative, it is determined that the inductor current $I_L$ is positive, and the zero cross sensing signal ZCDp is retained at the L level.

The voltage of the node SW is positive, and the zero cross sensing signal ZCDp is at the H level, at timings t10 to t13, and t15 and t16. The dead time control device 14 performs control for accelerating a timing for transitioning the driving signal LDRVp to the L level from the H level. That is, control for shortening a turn-on time the switching transistor on the lowside is performed. On the other hand, the voltage of the node SW is negative, and the zero cross sensing signal ZCDp is at the L level, at the timings t14 and t17. The dead time control device 14 performs control for delaying the timing for transitioning the driving signal LDRVp to the L level from the H level, and for lengthening the turn-on time of the switching transistor on the lowside.

The dead time control device 14 regulates a release period of the node SW in which both of the driving signals HDRVp and LDRVp are at the L level, in accordance with the zero cross sensing signal ZCDp. When the voltage of the node SW immediately after the driving signal LDRVp is transitioned to the L level is positive, and the zero cross sensing signal ZCDp is at the H level, a delay time until the driving signal HDRVp is set at the H level after the driving signal LDRVp is set at the L level is slightly lengthened. In contrast, when the voltage of the node SW immediately after the driving signal LDRVp is transitioned to the L level is negative, and the zero cross sensing signal ZCDp is at the L level, a delay time until the driving signal HDRVp is set at the H level after the driving signal LDRVp is set at the L level is slightly shortened. The dead time is suitably regulated by repeating such a manipulation, and thus, the inductor current $I_L$ is prevented from flowing back.

In the synchronous rectification switching power circuit of this embodiment, the inductor current $I_L$ is prevented from flowing back, by regulating the dead time, and thus, the CCM and the DCM are set in the light load. In a case where the voltage of the node SW immediately before the switching transistor on the highside is turned on is greater than 0

V, the load amount determination device 9 determines that the load is the light load, sets the mode sensing signal DCMp at the H level, and retains such a state. The switching device 5 receives the mode sensing signal DCMp, and switches the phase compensation circuit 4 for a heavy load to the phase compensation circuit 3 for a light load. Simultaneously, a regulation function of the dead time control device 14 with respect to the release period of the node SW according is valid during a period in which the mode sensing signal DCMp is at the H level. In contrast, in a case where the voltage of the node SW is less than 0 V at a point when the driving signal HDRVp is at the H level, the load amount determination device 9 determines that the load is the heavy load, sets the mode sensing signal DCMp at the L level, and retains such a state. The switching device 5 switches the phase compensation circuit 3 for a light load to the phase compensation circuit 4 for a heavy load.

The regulation function of the dead time control device 14 with respect to the release period of the node SW is invalid during a period in which the mode sensing signal DCMp is at the L level, and the release period of the node SW is instantaneously reset to the minimum time that is required to prevent the through current.

According to this embodiment, the inductor current $I_L$ is suitably controlled in accordance with the load, and thus, a power efficiency at the time of the light load is improved. Simultaneously, the phase compensation circuit is switched in accordance with whether the load is the light load or the heavy load, and thus, the stability of the voltage feedback control is ensured, and the load response properties are improved.

Sixth Embodiment

Figure 10:
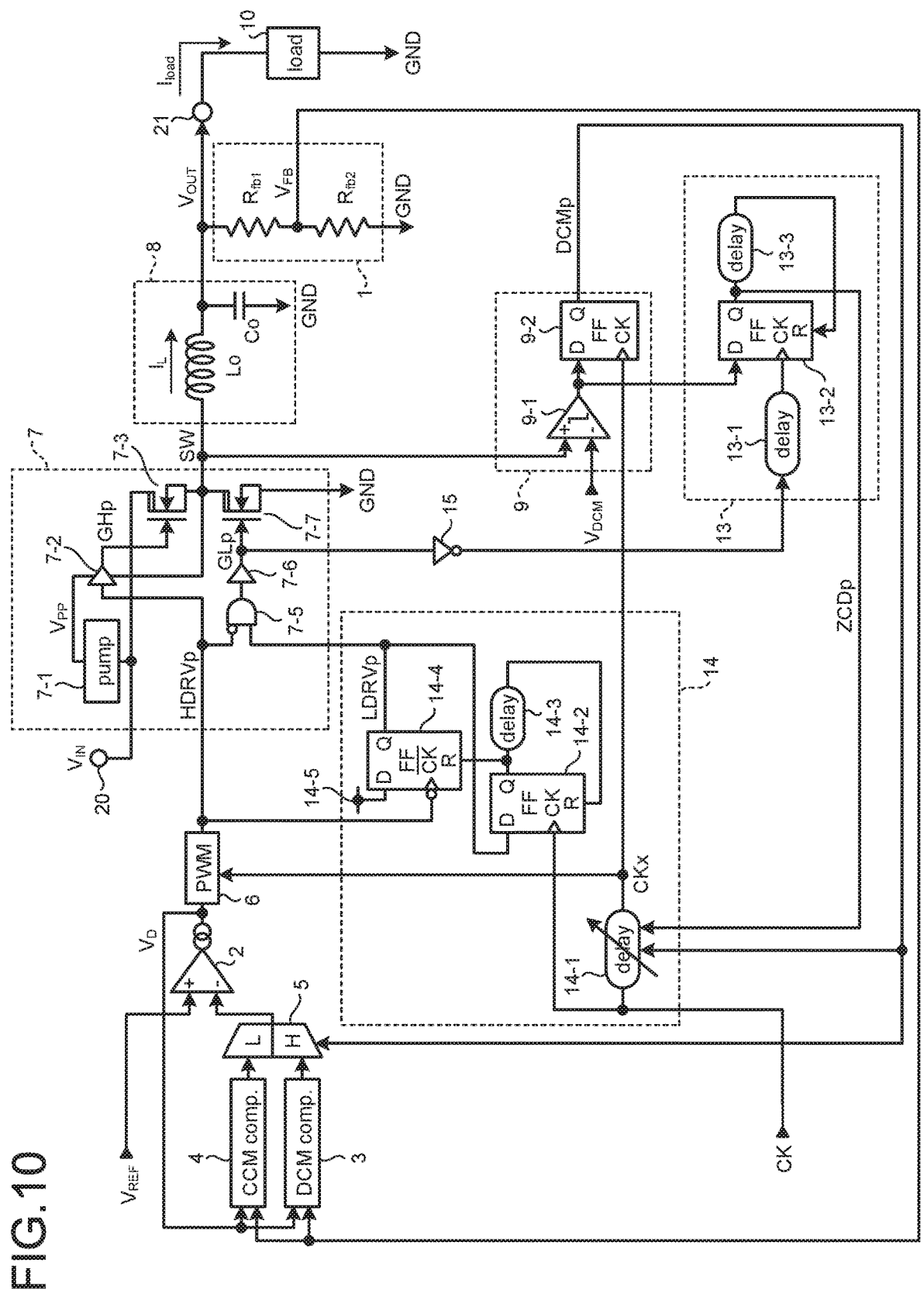
FIG. 10 is a diagram illustrating a configuration of a switching power circuit of a sixth embodiment.

FIG. 10 is a configuration diagram of a switching power circuit of a sixth embodiment. The driver circuit 7 of this embodiment includes the voltage boosting charge pump 7-1, the pre-driver 7-2, the switching transistor 7-3 on the highside, a through current prevention control device 7-5, a pre-driver 7-6, and a switching transistor 7-7 on the lowside.

The voltage boosting charge pump 7-1 receives the input voltage $V_{IN}$, and generates a high voltage $V_{PP}$. The pre-driver 7-2 is a buffer that is biases by the voltage $V_{PP}$ as a high voltage and the voltage of the node SW as a low voltage, and operates to generate a gate driving signal GHp by shifting the voltage of the driving signal HDRVp.

The switching transistor 7-3 is an NMOS type switching transistor, in which the gate driving signal GHp is supplied to a gate. The switching transistor 7-3 is turned on when the gate driving signal GHp is at the H level, electrically connects the node SW that is connected to a source and the input terminal 20 that is connected to a drain, at a low resistance, and sets a high resistance between node SW and the input terminal 20 when the gate driving signal GHp is at the L level.

The through current prevention control device 7-5 transfers the state of the driving signal LDRVp to the pre-driver 7-6 on the next stage when the driving signal HDRVp is at the L level. On the other hand, the through current prevention control device 7-5 retains the driving signal LDRVp at the L level when the driving signal HDRVp is at the H level, and thus, prevents the through current from flowing to the switching transistor 7-7 from the switching transistor 7-3.

The pre-driver 7-6 receives an output signal of the through current prevention control device 7-5, and generates a gate driving signal GLp. The switching transistor 7-7 is an NMOS type switching transistor, in which the gate driving signal GLp is supplied to a gate. The switching transistor 7-7 is turned on when the gate driving signal GLp is at the H level, electrically connects the node SW that is connected to a drain and the ground GND that is connected to a source, at a low resistance, and sets a high resistance between the node SW and the ground GND when the gate driving signal GLp is at the L level.

The load amount determination device 9 includes the comparator 9-1 and the D type flip-flop 9-2. The load amount determination device 9 generates the mode sensing signal DCMp, in accordance with the voltage of the node SW immediately before the switching transistor 7-3 is turned on. The comparator 9-1 outputs the H level when the voltage of the node SW is higher than the load determination reference voltage $V_{DCM}$, and outputs the L level, otherwise.

The zero cross sensing device 13 includes a delay timer 13-1, a latch 13-2, and a pulse width timer 13-3. The gate driving signal GLp is supplied to the delay timer 13-1 through and inverter 15. The gate driving signal GLp is at the L level, and the voltage of the node SW is changed, and thus, the delay timer 13-1 delays an output signal of the inverter 15 by only a time that is required to determine whether the inductor current $I_L$ is positive or negative, and generates a timing signal. The latch 13-2 incorporates the state of an output signal of the comparator 9-1 at a timing when the gate driving signal GLp is transitioned to the L level to be retained therein, and outputs the state as the zero cross sensing signal ZCDp. The pulse width timer 13-3 receives the zero cross sensing signal ZCDp that is the output of the latch 13-2, delays the zero cross sensing signal ZCDp for a constant time to supply to a reset terminal of the latch 13-2.

According to such a configuration, the zero cross sensing device 13 senses the voltage of the node SW, and outputs the zero cross sensing signal ZCDp that is at the H level with a slight delay after the clock signal CK is transitioned to the H level, and returns to the L level after a constant time, in a case where the zero cross sensing device 13 senses that the inductor current $I_L$ is negative. In this embodiment, the comparator 9-1 of the load amount determination device 9 is shared by the zero cross sensing device 13, but an individual comparator (not illustrated) that compares the voltage of the node SW with the predetermined reference voltage may be provided in the zero cross sensing device 13.

The dead time control device 14 includes a variable timer 14-1, a latch circuit 14-2, a delay circuit 14-3, and a latch circuit 14-4. The variable timer 14-1 generates a delay clock signal CKx in which the clock signal CK is delayed. Such a delay time is variable. When the mode sensing signal DCMp is at the L level, the delay time is instantaneously reset to the shortest time in which the through current does not flow to the switching transistor 7-7 from the switching transistor 7-3, and when the mode sensing signal DCMp is at the H level, a variable function of the delay time is valid.

In a case where the zero cross sensing signal ZCDp at the H level is received during a period in which the variable function of the delay time is valid, the delay time slightly lengthens, whereas the delay time slightly shortens at the time of the zero cross sensing signal ZCDp at the L level. The delay clock signal CKx is supplied to the pulse width modulator 6 and the load amount determination device 9. The latch circuit 14-2 incorporates the state of the driving signal LDRVp at a timing when the clock signal CK is transitioned to the H level, and generates a lowside reset signal. The delay circuit 14-3 generates a reset signal that is delayed for a constant time from the lowside reset signal, and supplies the reset signal to a reset terminal of the latch circuit 14-2. The lowside reset signal is a pulse signal having a constant width that is generated only when the driving signal LDRVp is at the H level.

The latch circuit 14-4 sets the driving signal LDRVp at the H level at a timing when the driving signal HDRVp is transitioned to the L level, and receives the pulse of the lowside reset signal at the H level to reset the driving signal LDRVp at the L level.

Figure 11:
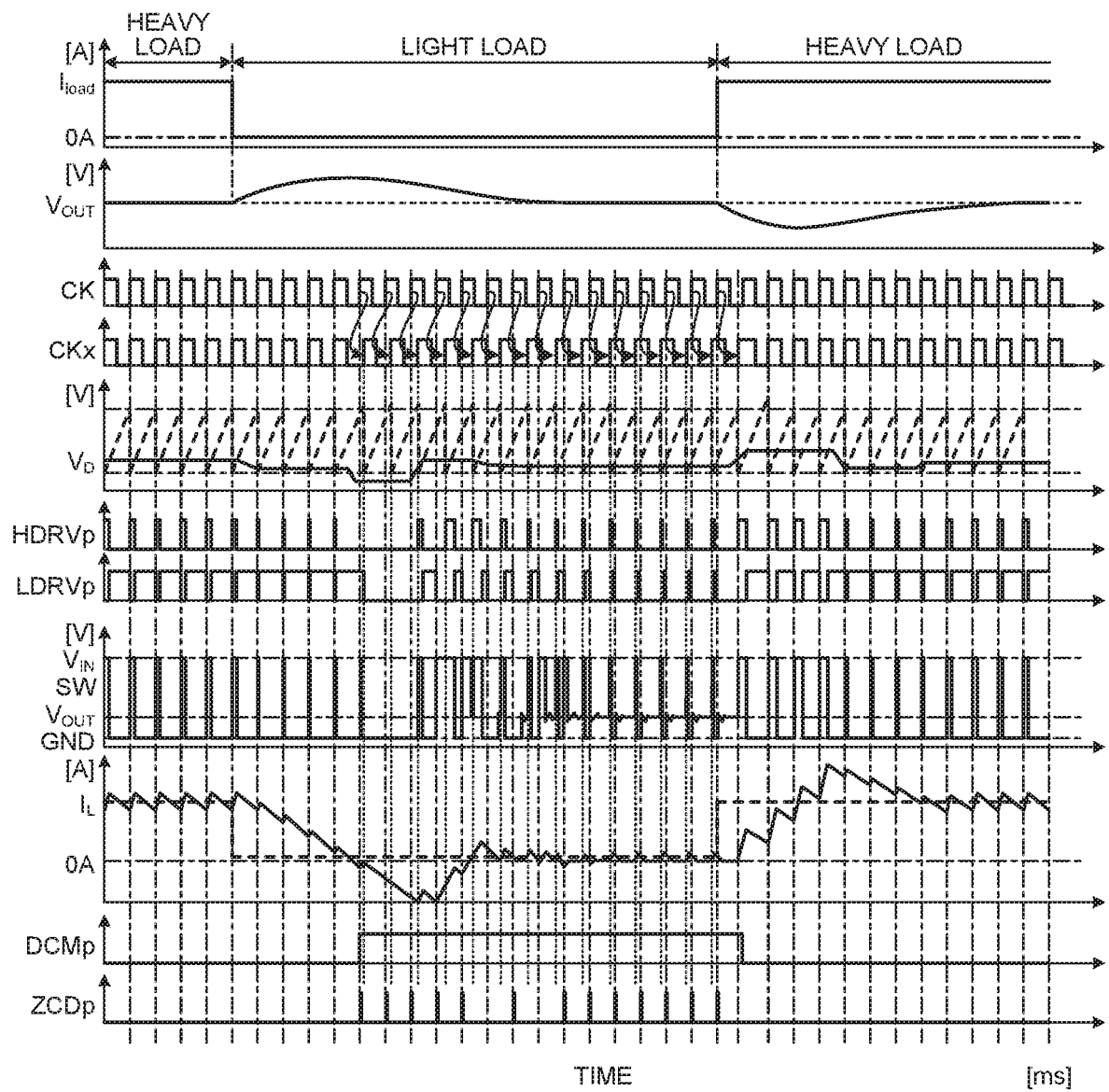
FIG. 11 is a diagram schematically illustrating an operation waveform of the switching power circuit of the sixth embodiment.

FIG. 11 is a diagram schematically illustrating an operation waveform of the switching power circuit of the sixth embodiment. The operation of the switching power circuit of this embodiment will be described by using FIG. 11. The load current $I_{load}$ is illustrated on the first line. A case is schematically illustrated in which the load 10 is changed to the light load from the heavy load, and is returned again to the heavy load.

The output voltage $V_{OUT}$ is illustrated on the next line. The output voltage $V_{OUT}$ increases at a time point when the load precipitously decreases. The phase compensation circuit 3 for a light load is selected, and the output voltage $V_{OUT}$ gradually decreases and returns to the set voltage illustrated by a broken line, by the voltage feedback control. Next, the output voltage $V_{OUT}$ decreases at a time point when the load precipitously increases. The phase compensation circuit 4 for a heavy load is selected, and the output voltage $V_{OUT}$ gradually increases and returns to the set voltage, by the voltage feedback control.

The clock signal CK and the waveform of the delay clock signal CKx are illustrated on the next line. The clock signal CK is a timing signal that repeats the H level and the L level at regular intervals. On the other hand, the delay clock signal CKx is a timing signal that is delayed by the dead time control device 14. Such a delay time is regulated by the zero cross sensing signal ZCDp illustrated on the last line.

The instruction signal $V_D$ is illustrated by a solid line, and the sawtooth wave is illustrated by a broken line, on the next line. The sawtooth wave is generated by the sawtooth wave generation circuit (not illustrated) provided in the pulse width modulator 6, in response to the delay clock signal CKx. In a case where the output voltage $V_{OUT}$ is higher than the set voltage, the error amplifier 2 decreases the voltage of the instruction signal $V_D$. In contrast, in a case where the output voltage $V_{OUT}$ is lower than the set voltage, the error amplifier 2 increases the voltage of the instruction signal $V_D$. The pulse width modulator 6 compares a voltage relationship between the instruction signal $V_D$ and the sawtooth wave, and generates the driving signal HDRVp of which a duty ratio is controlled by the instruction signal $V_D$.

The driving signal HDRVp is illustrated on the next line. The driving signal HDRVp is at the H level when the sawtooth wave has a voltage lower than that of the instruction signal $V_D$, and is at the L level when the sawtooth wave has a voltage higher than that of the instruction signal. The driving signal HDRVp is the PWM signal of which a duty ratio is changed in accordance with the instruction signal $V_D$.

The driving signal LDRVp is illustrated on the next line. The driving signal LDRVp is basically an inversion signal of the driving signal HDRVp. However, when the mode sensing signal DCMp is at the H level, in the light load, a delay occurs at a timing when the clock signal CK and the delay clock signal CKx are transitioned to the H level. The driving signal LDRVp is reset at the L level at a timing when the clock signal CK is transitioned to the H level, and the driving signal HDRVp is set to the H level at a timing when the delay clock signal CKx is transitioned to the H level. Therefore, a period occurs in which both of the driving signal LDRVp and the driving signal HDRVp are at the L level.

The voltage waveform of the node SW is illustrated on the next line. When the driving signal HDRVp is at the H level, the node SW is connected to the input terminal 20. At this time, the voltage of the node SW is a voltage that is approximately identical to the input voltage $V_{IN}$. When the driving signal LDRVp is at the H level, the node SW is connected to the ground GND, and the voltage is approximately 0 V. In addition, when both of the driving signal HDRVp and the driving signal LDRVp are at the L level, the node SW is released, and the voltage varies due to the inductor current $I_L$. In a case where the inductor current $I_L$ is zero, the voltage of the node SW is identical to the output voltage $V_{OUT}$.

The inductor current $I_L$ is illustrated by a solid line, on the next line. In a case where the node SW is connected to the input terminal 20, the voltage difference $V_{OUT}$-$V_{IN}$ occurs on the both ends of the inductor Lo, and the inductor current $I_L$ is charged and increased. After that, in a case where the connection between the node SW and the input terminal 20 is released, the voltage of the node SW is grounded to be 0 V, and thus, the voltage difference $-V_{IN}$ occurs on the both ends of the inductor Lo, and the inductor current $I_L$ is discharged and decreased.

When the load current $I_{load}$ illustrated by a broken line is constant, the average value $|I_L|$ of the inductor current $I_L$ is coincident with the current amount. In a case where the load current $I_{load}$ decreases, the time for connecting the node SW and the input terminal 20 shortens, and the inductor current $I_L$ decreases, by the voltage feedback control. In contrast, in a case where the load current $I_{load}$ increases, the time for connecting the node SW and the input terminal 20 lengthens, and the inductor current $I_L$ increases, by the voltage feedback control.

However, in a case where the load current $I_{load}$ precipitously decreases, the decrease rate of the inductor current $I_L$ does not catch up the decrease rate of the load current, and thus, the current is excessive supplied, and the voltage of the output voltage $V_{OUT}$ increases with respect to the set value. In a case where the increase amount is large, the voltage of the instruction signal $V_D$ extremely decreases, and the period continues in which the node SW and the input terminal 20 are not connected to each other.

Consequently, the inductor current $I_L$ is completely discharged, the current flows back to the node SW from the output terminal 21, and the voltage of the node SW increases to the output voltage $V_{OUT}$. Even after the average value $|I_L|$ of the inductor current $I_L$ is identical to the load current $I_{load}$, an increase in the voltage of the node SW occurs until the driving signal HDRVp is at the H level after the driving signal LDRVp is at the L level.

The load amount determination device 9 is operated at a point when the delay clock signal CKx is transitioned to the H level, senses the voltage of the node SW immediately before the switching transistor 7-3 is turned on, and outputs the mode sensing signal DCMp, in accordance with the result thereof.

The zero cross sensing device 13 of the synchronous rectification switching power circuit of this example senses the voltage of the node SW since a constant time has elapsed after the driving signal LDRVp is at the L level. In a case where the sensed voltage is higher than 0 V, and it is sensed that the inductor current $I_L$ flows back, the zero cross sensing signal ZCDp at the H level is generated. The dead time control device 14 extends an internal delay time, in response to the zero cross sensing signal ZCDp, and thus, regulates a period in which both of the driving signal LDRVp and the driving signal HDRVp are at the L level.

As described above, in the switching power circuit of this embodiment, a backflow amount of the inductor current $I_L$ at the time of the light load is suppressed, and thus, it is possible to improve the power conversion efficiency. In addition, the properties of the phase compensation circuit are switched in accordance with the load state, and thus, the load response properties can be improved in accordance with the load state. Accordingly, it is possible to suppress a variation in the output voltage $V_{OUT}$ by quickly reacting to a variation in the load.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A switching power circuit, comprising:
   a switching transistor in which a main current path is connected between an input terminal to which an input voltage is applied and a node;
   an inductor that is connected between an output terminal outputting an output voltage and the node;
   an error amplifier that outputs an instruction signal according to a difference between a feedback voltage of the output voltage and a reference voltage;
   a driving circuit that generates a driving signal of which a duty ratio is controlled in accordance with the instruction signal, and supplies the driving signal to the switching transistor;
   a phase compensation circuit that supplies the feedback voltage to the error amplifier; and
   a sensing circuit that senses a voltage of the node,
   wherein properties of the phase compensation circuit are switched in accordance with the voltage of the node immediately before the switching transistor is turned on,
   the driving circuit includes a pulse width modulator that generates a PWM signal of which a duty ratio is controlled in accordance with the instruction signal, in response to a clock signal, and
   the sensing circuit includes:
      a comparison circuit that compares a voltage of the node with a set voltage; and
      a latch circuit that latches output of the comparison circuit, in response to the clock signal.

2. The switching power circuit according to claim 1,
   wherein the phase compensation circuit includes a first phase compensation circuit having first properties and a second phase compensation circuit having second properties, and
   the first and second properties of the first and second phase compensation circuits are switched by selecting one of the first phase compensation circuit and the second phase compensation circuit, in accordance with the voltage of the node.

3. The switching power circuit according to claim 2, further comprising:
   a selection circuit to which outputs of the first phase compensation circuit and the second phase compensation circuit are supplied,
   wherein the selection circuit selects one of the first phase compensation circuit and the second phase compensation circuit, in accordance with the voltage of the node, to be connected to the error amplifier.

4. The switching power circuit according to claim 2, further comprising:
   a voltage follower circuit in which the reference voltage is supplied to an input end on a non-inversion side; and
   a switching device that connects one of the first phase compensation circuit and the second phase compensation circuit to an output end of the voltage follower circuit, the one of the first phase compensation circuit and the second phase compensation circuit not being connected to the error amplifier.

5. The switching power circuit according to claim 4,
   wherein the switching device selectively connects the one of the first phase compensation circuit and the second phase compensation circuit to the output end of the voltage follower circuit, in accordance with the voltage of the node.

6. The switching power circuit according to claim 1,
   wherein the phase compensation circuit includes a plurality of resistances connected in series, and a switch that is connected to at least one of the plurality of resistances in parallel, and where a connection relationship of the plurality of resistances is switched by controlling On/Off of the switch, in accordance with the voltage of the node.

7. The switching power circuit according to claim 1, further comprising:
   a diode that is connected in a forward direction from a ground to the node.

8. A switching power circuit, comprising:
   an input terminal to which an input voltage is applied;
   a first switching transistor in which a main current path is connected between the input terminal and a node;
   a second switching transistor in which a main current path is connected between the node and a ground;
   an output terminal that outputs an output voltage;
   an inductor that is connected between the output terminal and the node;
   an error amplifier that outputs an instruction signal according to a difference between a feedback voltage of the output voltage and a reference voltage;
   a PWM signal generation circuit that generates a PWM signal of which a duty ratio is controlled in accordance with the instruction signal;
   a first driving signal generation circuit that generates a first driving signal for controlling On/Off of the first switching transistor, in response to output of the PWM signal generation circuit;
   a second driving signal generation circuit that generates a second driving signal for controlling On/Off of the second switching transistor, in response to the output of the PWM signal generation circuit;
   a phase compensation circuit that supplies the feedback voltage to the error amplifier;
   a sensing circuit that senses a voltage of the node;
   a switching circuit that switches properties of the phase compensation circuit, in accordance with the voltage of the node immediately before the first switching transistor is turned on; and a regulator circuit that regulates a duty ratio of the second driving signal generated by the second driving signal generation circuit, in accordance with the voltage of the node immediately after the second switching transistor is turned off, wherein the regulator circuit includes a first latch circuit that latches output of the sensing circuit at a timing when the second driving signal is delayed for a predetermined time.

9. The switching power circuit according to claim 8, wherein the phase compensation circuit includes a first phase compensation circuit having first properties and a second phase compensation circuit having second properties, and switches the properties of the phase compensation circuit by selecting one of the first phase compensation circuit and the second phase compensation circuit, in accordance with the voltage of the node.

10. The switching power circuit according to claim 9, further comprising:

a switching device to which output of the first phase compensation circuit and the second phase compensation circuit is supplied, wherein the switching device selects one of the first phase compensation circuit and the second phase compensation circuit, in accordance with the voltage of the node, to be connected to the error amplifier.

11. The switching power circuit according to claim 8, wherein the PWM signal generation circuit generates the PWM signal of which the duty ratio is controlled in accordance with the instruction signal, in response to a clock signal.

12. The switching power circuit according to claim 8, wherein the regulator circuit includes a delay circuit in which a delay time is controlled by the output of the sensing circuit and an output signal of the latch circuit.

13. The switching power circuit according to claim 12, wherein the clock signal is supplied to the PWM signal generation circuit through the delay circuit.

14. The switching power circuit according to claim 8, wherein the regulator circuit decreases a turn-on time of the second switching transistor in a case where the voltage of the node immediately after the second switching transistor is turned off is positive, and increases the turn-on time of the second switching transistor in a case where the voltage of the node immediately after the second switching transistor is turned off is negative.

15. The switching power circuit according to claim 12, wherein the sensing circuit includes a comparison circuit that compares the voltage of the node with a set voltage, and a second latch circuit that latches output of the comparison circuit, in response to the clock signal.

16. The switching power circuit according to claim 14, wherein the regulator circuit includes a latch circuit that latches output of the sensing circuit at a timing when the second driving signal is delayed for a predetermined time.

17. The switching power circuit according to claim 8, wherein each of the first switching transistor and the second switching transistor is composed of an NMOS transistor.

18. A switching power circuit, comprising:

a switching transistor in which a main current path is connected between an input terminal to which an input voltage is applied and a node;

an inductor that is connected between an output terminal outputting an output voltage and the node;

an error amplifier that outputs an instruction signal according to a difference between a feedback voltage of the output voltage and a reference voltage;

a driving circuit that generates a driving signal of which a duty ratio is controlled in accordance with the instruction signal, and supplies the driving signal to the switching transistor;

a phase compensation circuit that supplies the feedback voltage to the error amplifier; and a sensing circuit that senses a voltage of the node, wherein properties of the phase compensation circuit are switched in accordance with the voltage of the node immediately before the switching transistor is turned on, the phase compensation circuit includes a first phase compensation circuit having first properties and a second phase compensation circuit having second properties, the first and second properties of the first and second phase compensation circuits are switched by selecting one of the first phase compensation circuit and the second phase compensation circuit, in accordance with the voltage of the node, and the switching power circuit further comprises:

a voltage follower circuit in which the reference voltage is supplied to an input end on a non-inversion side; and a switching device that connects one of the first phase compensation circuit and the second phase compensation circuit to an output end of the voltage follower circuit, the one of the first phase compensation circuit and the second phase compensation circuit not being connected to the error amplifier.

19. The switching power circuit according to claim 18, further comprising:

a selection circuit to which outputs of the first phase compensation circuit and the second phase compensation circuit are supplied, wherein the selection circuit selects one of the first phase compensation circuit and the second phase compensation circuit, in accordance with the voltage of the node, to be connected to the error amplifier.

20. The switching power circuit according to claim 18, wherein the phase compensation circuit includes a plurality of resistances connected in series, and a switch that is connected to at least one of the plurality of resistances in parallel, and where a connection relationship of the plurality of resistances is switched by controlling On/Off of the switch, in accordance with the voltage of the node.

21. The switching power circuit according to claim 18, wherein the switching device selectively connects the one of the first phase compensation circuit and the second phase compensation circuit to the output end of the voltage follower circuit, in accordance with the voltage of the node.

22. The switching power circuit according to claim 18, further comprising:

a diode that is connected in a forward direction from a ground to the node.

23. The switching power circuit according to claim 18, wherein the driving circuit includes a pulse width modulator that generates a PWM signal of which a duty ratio is controlled in accordance with the instruction signal, in response to a clock signal.

24. The switching power circuit according to claim 23, wherein the sensing circuit includes a comparison circuit that compares the voltage of the node with a set voltage, and a latch circuit that latches output of the comparison circuit, in response to the clock signal.

* * * * *